Figure 3:
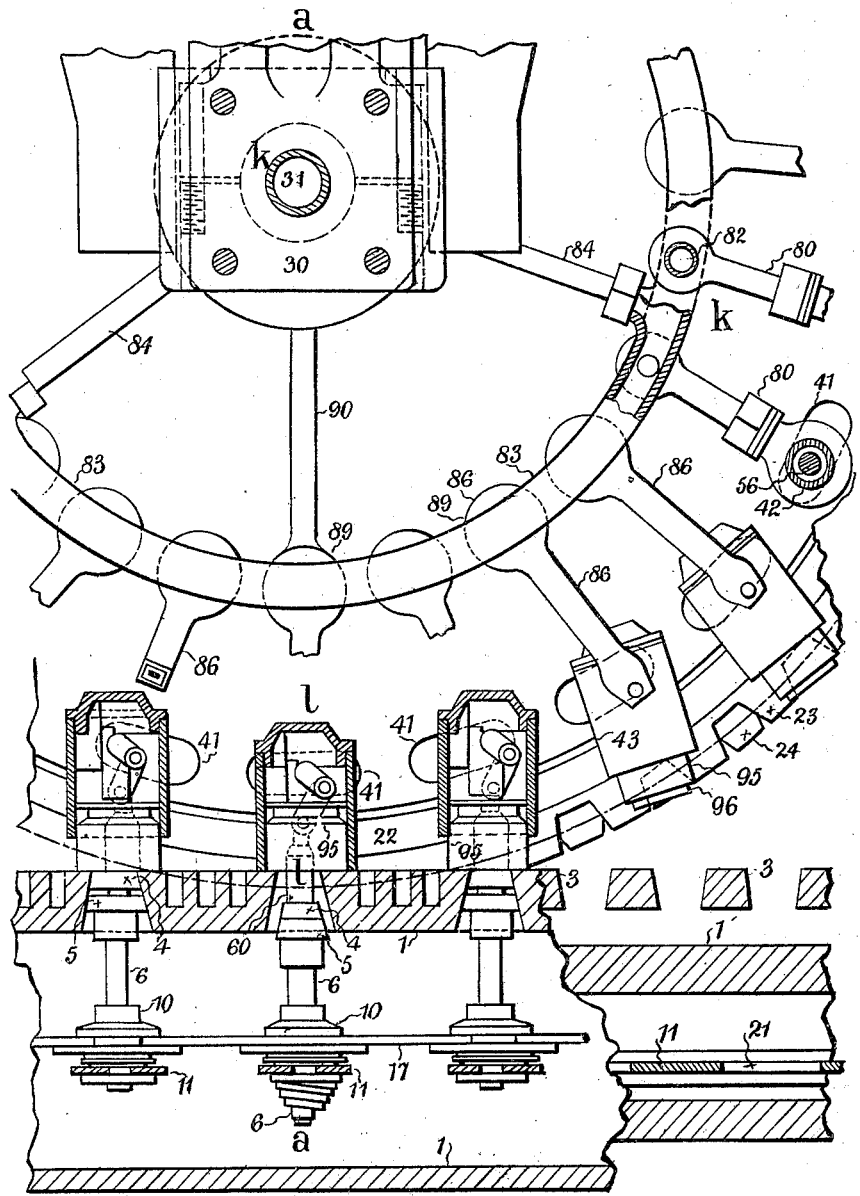

No. 672,459. Patented Apr. 23, 1901.
R. C. SAYER.
MEANS FOR SUPPLYING POWER FROM STATIONARY RAILS TO VEHICLES MOVING ON THE RAILS.
(Application filed Aug. 3, 1899.)
(No Model.) 8 Sheets—Sheet 1.
FIG. 1.
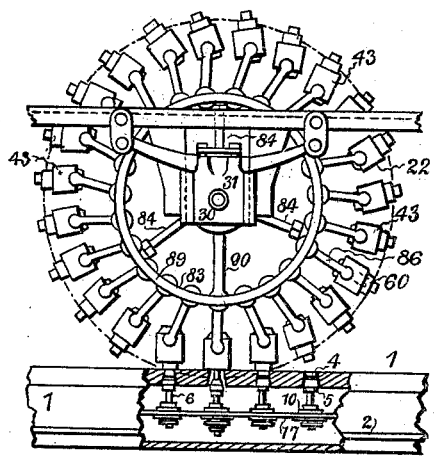
FIG. 2
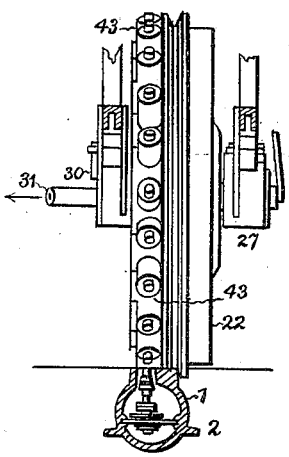
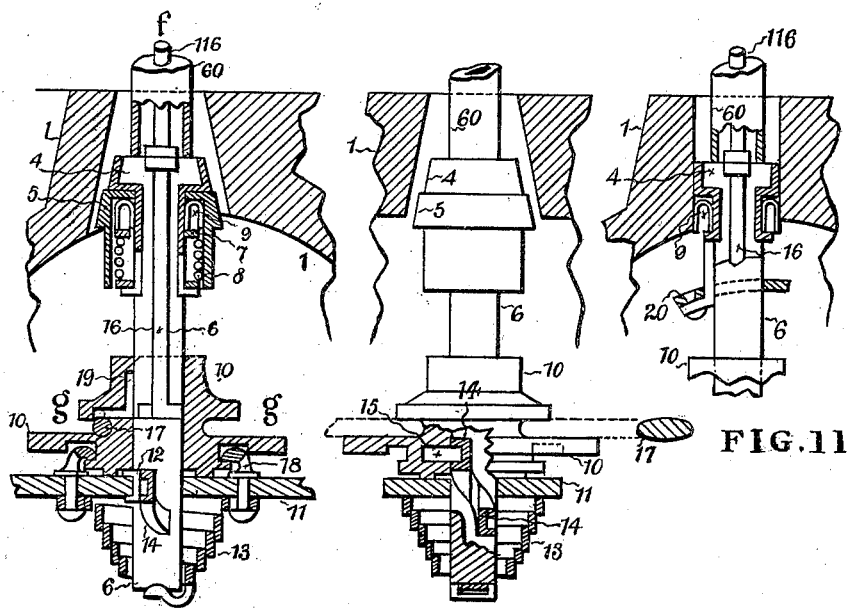
FIG. 9. FIG. 10. FIG. 11.
Witnesses
Albert Jones
Samuel Percival
Inventor
Robert Cooke Sayer
By his Attorneys
Wheatley & Mackenzie No. 672,459. Patented Apr. 23, 1901.
R. C. SAYER.
MEANS FOR SUPPLYING POWER FROM STATIONARY RAILS TO VEHICLES MOVING ON THE RAILS.
(Application filed Aug. 3, 1899.)
(No Model.) 8 Sheets—Sheet 2.

No. 672,459. Patented Apr. 23, 1901.
R. C. SAYER.
MEANS FOR SUPPLYING POWER FROM STATIONARY RAILS TO VEHICLES MOVING ON THE RAILS.
(Application filed Aug. 3, 1899.)
(No Model.) 8 Sheets—Sheet 3.

Witnesses.
Albert Jones
Samuel Percival

Inventor
Robert Cooke Sayer
By his Attorneys.
Wheatley & Mackenzie

No. 672,459. Patented Apr. 23, 1901.
R. C. SAYER.
MEANS FOR SUPPLYING POWER FROM STATIONARY RAILS TO VEHICLES MOVING ON THE RAILS.
(Application filed Aug. 3, 1899.)

(No Model.)
8 Sheets—Sheet 4.

Witnesses
Albert Jones
Samuel Percival

Inventor
Robert Cooke Sayer
By his Attorneys.
Wheatley & Mackenzie

No. 672,459. Patented Apr. 23, 1901.
R. C. SAYER.
MEANS FOR SUPPLYING POWER FROM STATIONARY RAILS TO VEHICLES MOVING ON THE RAILS.
(Application filed Aug. 3, 1899.)

(No Model.) 8 Sheets—Sheet 5.

Witnesses
Albert Jones
Samuel Percival

Inventor
Robert Cooke Sayer
By his Attorneys
Wheatley & Mackenzie

No. 672,459. Patented Apr. 23, 1901.
R. C. SAYER.
MEANS FOR SUPPLYING POWER FROM STATIONARY RAILS TO VEHICLES MOVING ON THE RAILS.
(Application filed Aug. 3, 1899.)

(No Model.) 8 Sheets—Sheet 6.

Witnesses
Albert Jones
Samuel Percival

Inventor
Robert Cooke Sayer
By his Attorneys.
Wheatley & MacKenzie

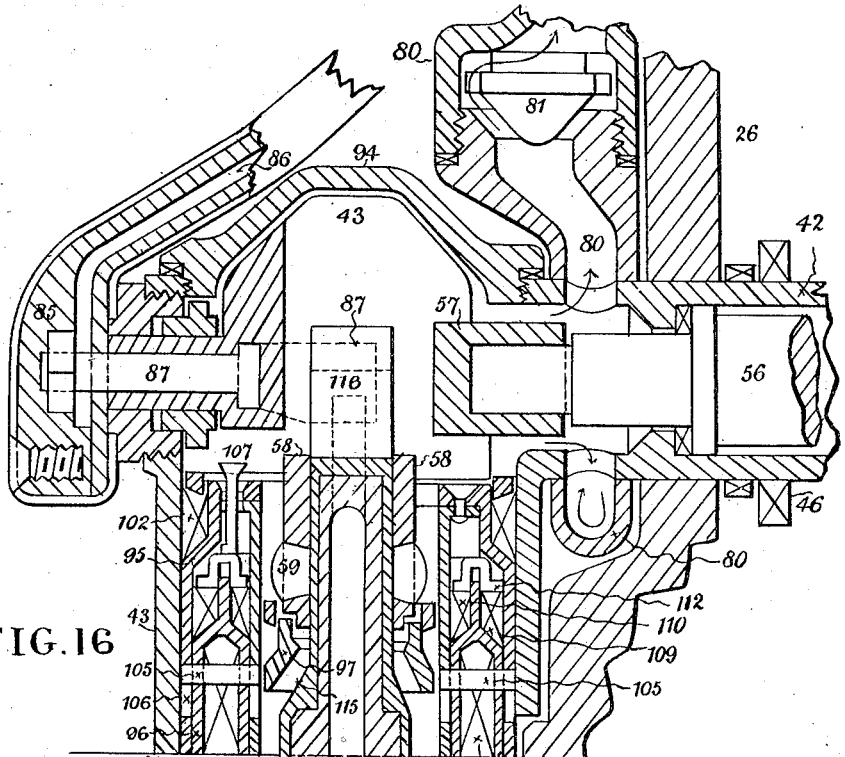

No. 672,459. Patented Apr. 23, 1901.
R. C. SAYER.
MEANS FOR SUPPLYING POWER FROM STATIONARY RAILS TO VEHICLES MOVING ON THE RAILS.
(Application filed Aug. 3, 1899.)
(No Model.) 8 Sheets—Sheet 8.

UNITED STATES PATENT OFFICE.

ROBERT COOKE SAYER, OF BRISTOL, ENGLAND.

MEANS FOR SUPPLYING POWER FROM STATIONARY RAILS TO VEHICLES MOVING ON THE RAILS.

SPECIFICATION forming part of Letters Patent No. 672,459, dated April 23, 1901.

Application filed August 3, 1899. Serial No. 726,047. (No model.)

*To all whom it may concern:*

Be it known that I, ROBERT COOKE SAYER, a subject of the Queen of Great Britain and Ireland, residing at Clyde road, Redland, Bristol, in the county of Gloucester, England, have invented certain new and useful Improvements in Means for Supplying Power from Stationary Rails to Vehicles Moving on the Rails, (for which I have made application for patent in Great Britain, No. 4,963, dated March 7, 1899;) and I do hereby declare the following to be a full, clear, and exact description of the invention, such as will enable others skilled in the art to which it appertains to make and use the same.

This invention for improved means for supplying power from a stationary rail to a vehicle moving on the rail consists of a tubular rail provided with teeth, a wheel mounted on the vehicle and provided with corresponding teeth, valves in the face of the rail, hollow radial pushers mounted on the wheel, a fixed cam-path to force the radial pushers outward to depress and open the valves on the rail, a fixed cam-path to move the pushers sidewise, so that they shall remain in correct position on the rail for an appreciable time while the wheel is traversing, a fixed cam-path to keep the pushers vertical during this period, a main electric conductor within the rail, supported alternatively on opposite sides of grooved insulators mounted in the rail, means on the valve-stems for rotating the insulators as the valves are depressed to bring conductors on the opposite side of the insulator into contact with the main conductor, conductors in the valves making contact with the conductors on the insulator, conductors in the radial pushers making contact with the conductors in the valve-stems and oscillating tube-arms, and conductors communicating with a tube and conductors in a fixed axle-tube.

Figure 4:
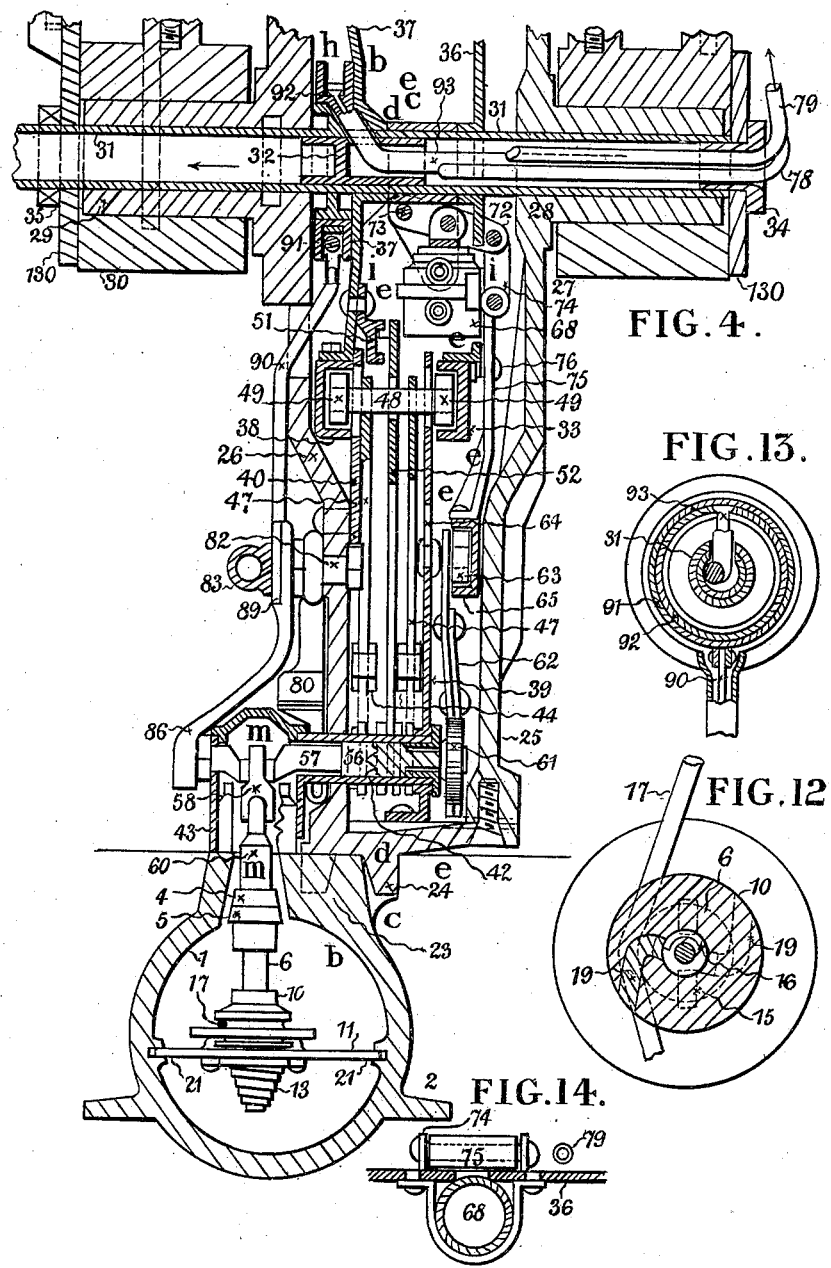
Figure 5:
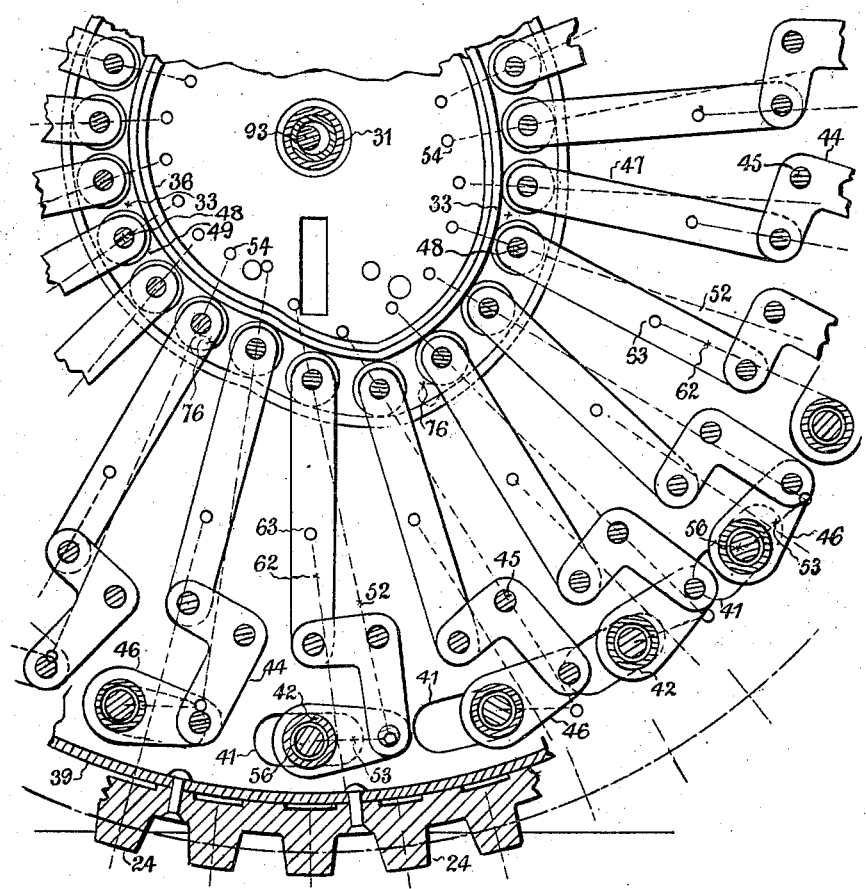
Figure 15:
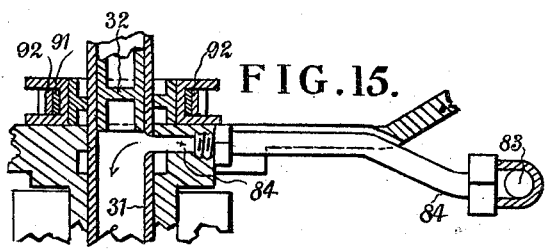
Figure 6:
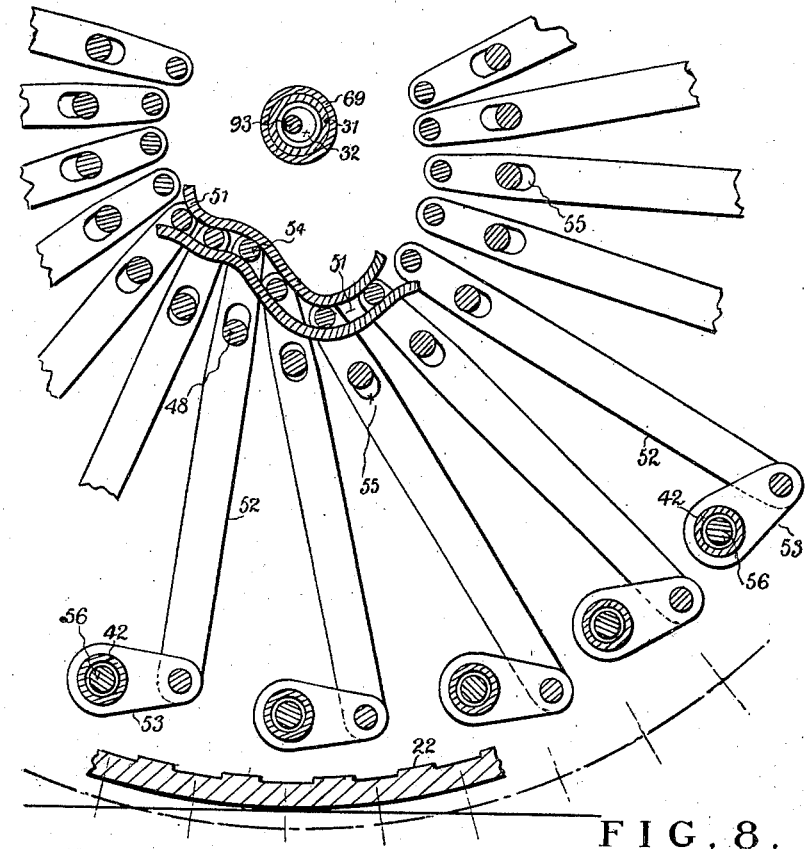
Figure 8:
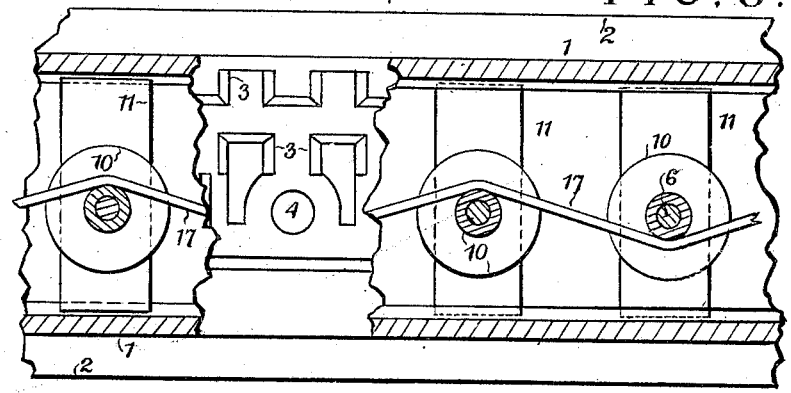
Figure 7:
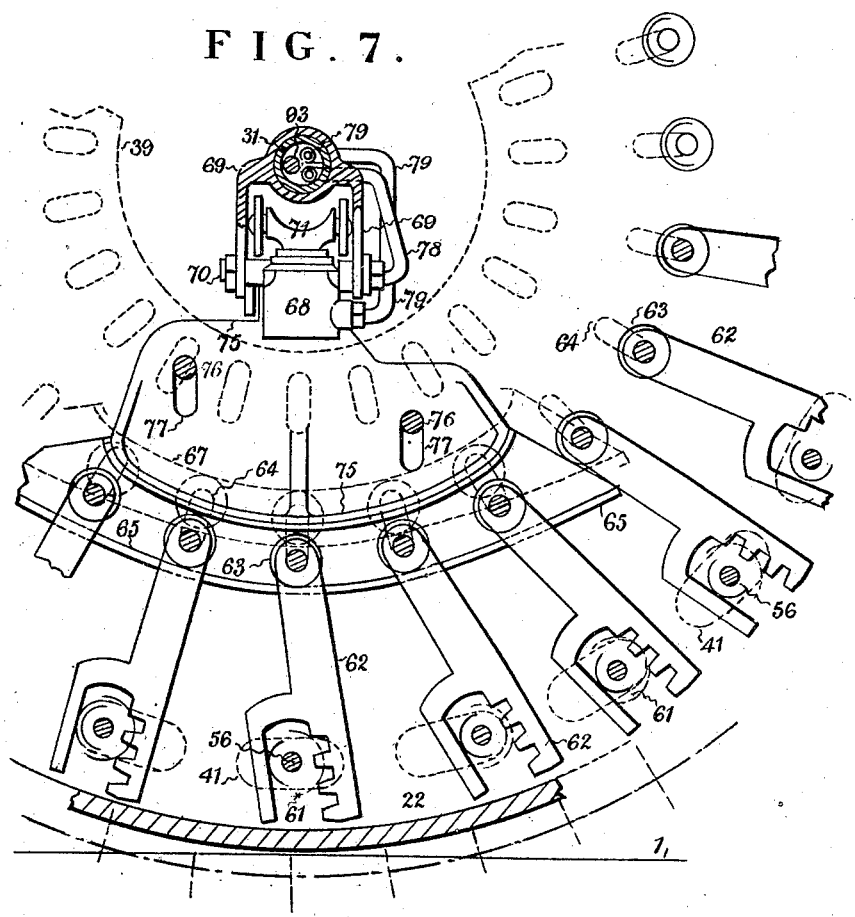
Figure 19:
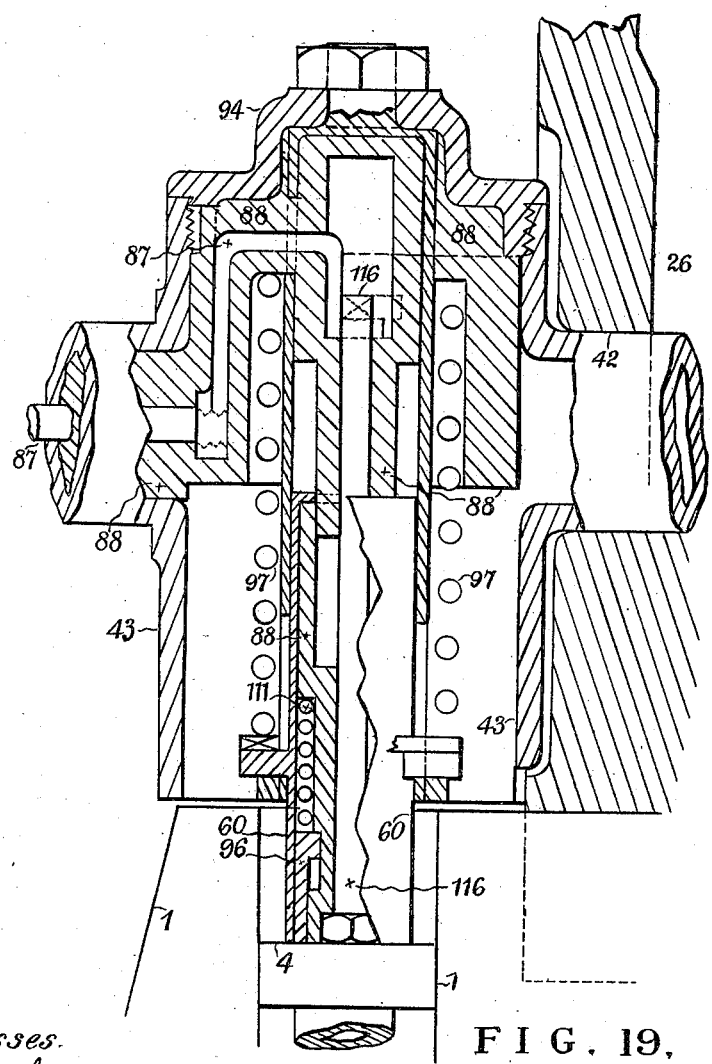

In the accompanying sheets of illustrative drawings, Figure 1 is a front elevation of a wheel and rail constructed according to this invention. Fig. 2 is an end elevation. Fig. 3 is a part front elevation to an enlarged scale. Fig. 4 is a cross-section at *a a*, Fig. 3. Figs. 5, 6, and 7 are sectional elevations at *b b*, *d d*, and *e e*, respectively, Fig. 4. Fig. 8 is a sectional plan of the tubular rail. Figs. 9 and 10 are cross-section and vertical longitudinal section through a rail-valve. Fig. 11 is a similar view to Fig. 9, showing a slight modification when electric energy is used alone. Fig. 12 is a plan of the insulator carrying the electric conductors in the tubular rail. Fig. 13 is a detail section showing the means of conveying the electric current from the moving parts of the wheel to the stationary tube. Fig. 14 is a section through the cylinders for drawing the parts out of their working positions when not to convey power. Fig. 15 is a detail showing the connection between the moving tubular parts on the wheel and the stationary tube. Figs. 16, 17, and 18 are vertical sections through the outer ends of the radial pushers. Fig. 19 is, in part, a similar view to Fig. 16 of the fixed pusher.

The rail 1 has flanges 2, teeth, and valve-seats for the double valves 4 and 5. A ring 7 takes the pressure of a spring 8 to force the valve 5 up toward the valve 4, the packing 9 preventing any escape between the valves. The insulators 10 are carried on the horizontal plate 11, that can be slid across grooves 21 on the rail 1. The valve-stem 6 is prevented from rotating by a key in the plate 11 and is provided with a spiral channel 14, acting on a lug 15 on the insulator 10 to give it a half-rotation when the stem 6 is thrust down. The insulator 10 is held down by bolts 18, and the spring 13 tends to close the valves 4 5. The continuous conductor 17 rests alternately in zigzag fashion in the opposite sides of the grooves in the insulator 10, and when the insulators are rotated the contact 19 on the insulator makes contact between the conductor 17 and a conductor 16 within the valve-stem 6.

The wheel 22 is formed in two parts 25 and 26 and carries two series of teeth 23 and 24 to correspond with the teeth of the rail 1 to keep it in line with it and in step circumferentially with the valves 4 and 5. The wheel-axles rest in bearings 27 and 30, and a tube 31, with a diaphragm 32, passes through the axle and is secured by nuts 34 and 35 and keys to the fixed plates 130 of the bearings. The tube 31 carries the fixed plates 36 and 37, to which are secured the two similar eccentric paths 33 and 38. The wheel 22 also carries circular slotted plates 39 and 40. The spindles 42 of chambers 43 are carried in slots 41 in the wheel parts 39 and 26, and the spindles are traversed in the slots by two series of bell-cranks 44, that are pivoted to the wheel parts 26 and 39 at 45 and are connected to the spindles by the links 46. The bell-cranks 44 are operated from the fixed cam-paths 33 38 by means of the links 47, connected in pairs by the shafts 48, carrying rollers 49, working in the cam-races as the wheel 22 rotates, so that as the chamber 43 comes to the valves 4 of the rail 1 the spindles 42 are at one end of the slots 41 and are held fixed by the eccentricity of the paths 33 and 38, thus allowing the wheel to pass on and bring the other end of the slots 41 up to the spindle 41. The spindles 42 are returned to the other end of the slots when the chambers 43 are above the rail by the upper portion of the cam-races. In order to keep the chambers 43 vertical when in contact with the rail, an eccentric path 51 is fixed to the wheel 37 and operates on the lugs 54 of the links 52, that actuate the arms 53, fixed rigidly to the spindles 42. The links 52 have slots 55 bearing on the spindles 48, the slots preventing the parts getting out of place as the links 52 are carried around by the spindles 48.

The chambers 43, Figs. 16 to 18, formed at the end of the spindles 42, have covers 94 and are closed at the bottom by cushions 95 and 96, the valve 97, and the hollow pin 60. The cushion 95 is hollow and slides in the chamber 43 and is provided with rods 98, whose heads 99 traverse slots 100 in the walls of the chamber 43, having stops 101. The cushion is provided with the packing-ring 103 and packing 102. The upper end of the cushion is provided with valves 107. The annular cushion 96 slides within the cushion 95 and is retained by bolts 105, working in slots 106. The cushion 96 is provided with a packing-ring 112, packing 109 and 110, and also with the packing 111, retained by the bolts 105. The valve 97 slides in the center of the cushion 96 and is provided with a packing-ring 114 and packing 113 and works between the ends of the links 58 and its seat 115 on the hollow pin 60, secured by trunnions 59 and links 58 to the cranks 57 on spindles 56, working on the spindles 42. The spindles 56 are rotated to force the hollow pin 60 into contact with the rail-valve by the cam-path 65, fixed to the plate 75 and operating the rack 62, gearing with a toothed quadrant 61 on the end of the spindle.

The path 65 is fixed in its operatve position shown or up at the dotted position 67 out of operation by a cylinder 68, carried by trunnions 70 and arms 69 on the tube 31 and having its piston-head 71 connected to the levers 72, that center at 73 on the arms 69 and operate the links 74, Fig. 14, to raise or lower the plate 75, that carries the cam-path 65, and is secured to the path 33 by bolts 76, that pass through slots 77. The spindles 42, Figs. 3, 4, and 16, are jointed to the end of an oscillating tube 80, having a valve 81. The other end of the oscillating tube is jointed by a hollow bolt 82 to the ring-tube 83 on the part 26 of the wheel and connected by the radial tubes 84, Fig. 15, with the axial tube 31. One end of the oscillating conductors 86 is also jointed to and insulated at 85 from the bolt 82, the other end being carried at the axis of the chamber 43 and connected with the conductor 87, insulated at 88, within 43. The bolt 82 also carries the ring-conductor 89, that connects all the conductors, and by the radials 90, Fig. 13, the circular ring 91, and fixed ring 92 is connected to the conductor 93, that passes through the tube 31.

It will readily be seen that when the valves 4 and 5 are opened by the pin 60 the electric pressure passes from the generator to the cable 17, the conductors 19, 16, 116, 87, 86, 89, 90, 91, 92, and 93, and the pressure from rail tube 1 passes through the valves 4 5, the valve 97, chamber 43, through the valve 81, arm 80, bolt 82, ring-tube 83, radials 84, and axial tube 31 of the wheel 22. The pressure acts against the cushions 95 and 96 and causes them to make a perfect joint with the rail.

What I claim, and desire to secure by Letters Patent, is—

1. The improved means for supplying power from a stationary rail to a vehicle moving on the rail consisting of a tubular rail provided with teeth, a wheel mounted on the vehicle and provided with corresponding teeth, valves in the face of the rail, pushers mounted on the wheel, a fixed cam-path to force pushers outward to depress and open the valves on the rail, a fixed cam-path to retain the pushers so that they shall remain in correct position on the valve for an appreciable time while the wheel is traversing, a fixed cam-path to keep the pushers vertical to the rail during this period, a main electric conductor within the rail, conductors in the valves making contact with the conductor in the rail conductors in the pushers making contact with the conductors in the valve and communicating with a tube and conductors on a fixed axle-tube.

2. The improved means for supplying power from a stationary rail to a vehicle moving on a rail consisting of tubular rails having alternately-spaced bevel-teeth, plug conical valves in the rail formed in two, one with a stem, conductor-insulators carrying a cable laid zigzag and carried on plates within the rail-tube, teeth on the wheels to engage with those of the rail to keep the wheel laterally in its direction and in step with its valves, fixed cam-paths secured to the bearings of the wheel, rollers connected by a spindle and driven along the cam by the wheel, rods, bell-cranks and links actuated by the rollers to give motions to spindles in slots in the wheel-carrying chambers to bring them to one end of the slots by the eccentricity of the paths, hold them when at the rail-valves as the wheel passes and brings the other ends of its slots up to the spindle, and when rotating above the rail retranslating the chambers to the former ends of the slots, an eccentric path, rods and links for the chambers giving them a motion of partial relation to meet the rail vertically in the chambers, cushions, rings, packings and valves to admit the pressure from the rail and retain it, a fixed spring-pusher in the chambers having a conductor adapted to open the rail-valves and bring their conductors to meet when thrust out, a fixed cam-path and connecting devices for forcing out pushers, a cranked spindle, a pressure-cylinder actuating the cranked spindle for moving the cam to its operative or inoperative position, oscillating tube-arms and conductors connecting the chambers to an axial tube and to a conductor into the tube the whole as described and shown on the drawings.

In testimony whereof I have affixed my signature in presence of two witnesses.

ROBERT COOKE SAYER.

Witnesses:
ANDREW WOOD WILKINSON,
JAMES PERRY COOMBE.